No. 793,710. PATENTED JULY 4, 1905.
W. BARNETT.
RAILWAY RAIL JOINT OR COUPLING.
APPLICATION FILED OCT. 24, 1904.
2 SHEETS—SHEET 1.
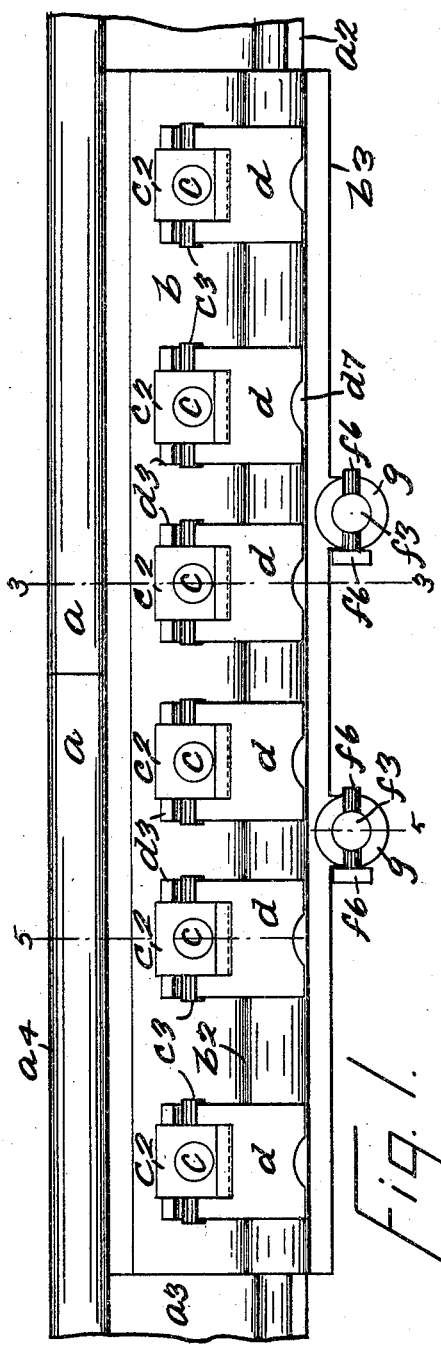
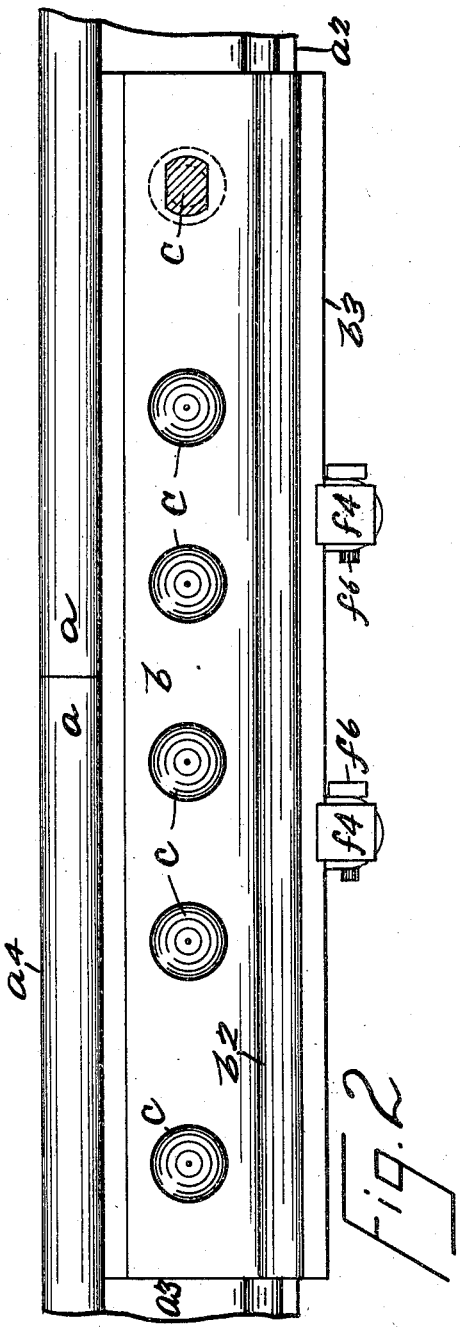
WITNESSES
INVENTOR
Walter Barnett
BY
Edgar Tate & Co
ATTORNEYS No. 793,710. PATENTED JULY 4, 1905.
W. BARNETT.
RAILWAY RAIL JOINT OR COUPLING.
APPLICATION FILED OCT. 24, 1904.
2 SHEETS—SHEET 2.
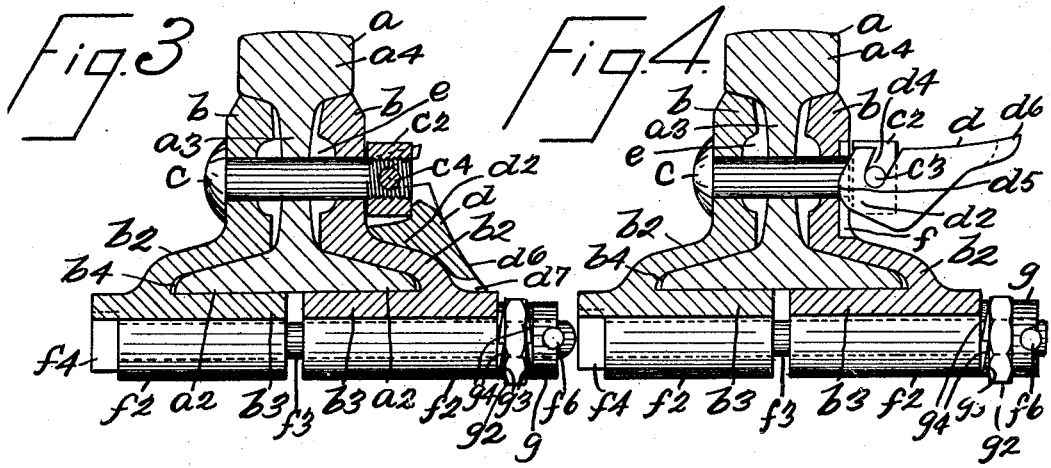
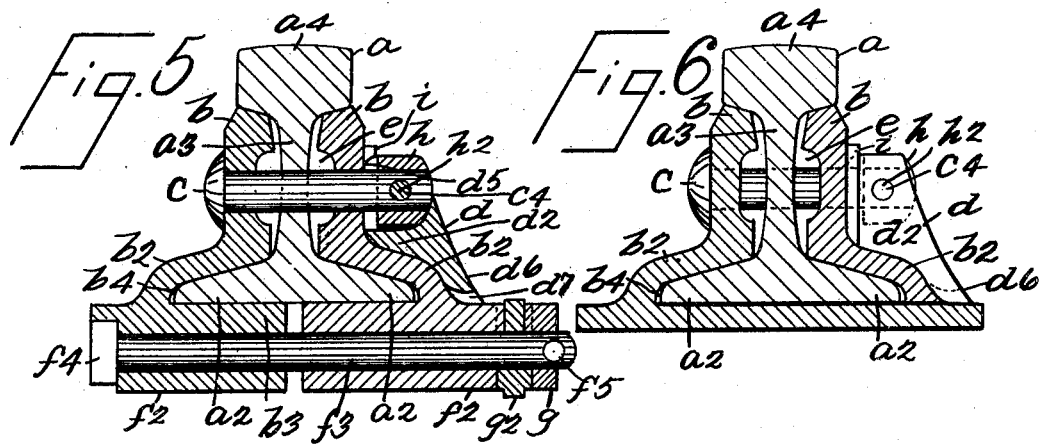
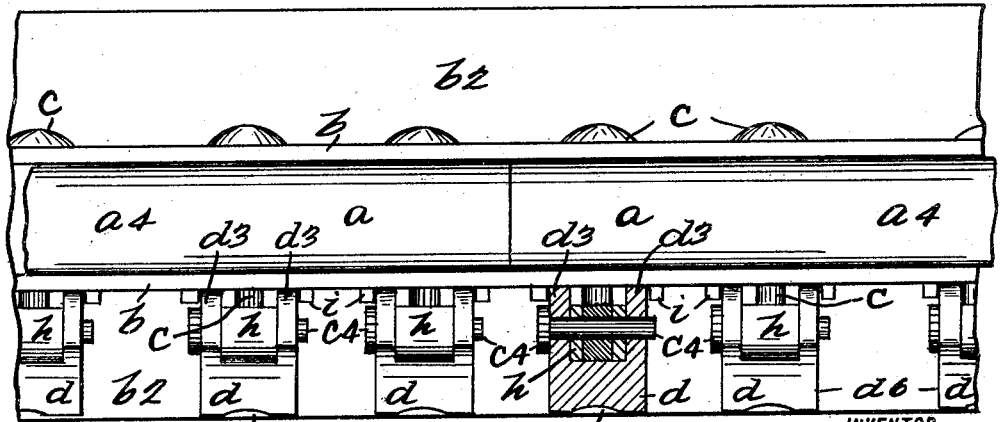
WITNESSES
INVENTOR
Walter Barnett
BY
Edgar Tate & Co
ATTORNEYS No. 793,710. Patented July 4, 1905.

UNITED STATES PATENT OFFICE.

WALTER BARNETT, OF HACKETTSTOWN, NEW JERSEY.

RAILWAY-RAIL JOINT OR COUPLING.

SPECIFICATION forming part of Letters Patent No. 793,710, dated July 4, 1905.

Application filed October 24, 1904. Serial No. 229,715.

*To all whom it may concern:*

Be it known that I, WALTER BARNETT, a citizen of the United States, residing at Hackettstown, in the county of Warren and State of New Jersey, have invented certain new and useful Improvements in Railway-Rail Joints or Couplings, of which the following is a specification, such as will enable those skilled in the art to which it appertains to make and use the same.

This invention relates to joints or couplings for railway-rails; and the object thereof is to provide a joint or coupling of this class which is simple in construction and operation and whereby the rails are jointed or coupled by means of fish plates or bars secured together and to the ends of the rails by transverse bolts having cam-locks, whereby the joint or coupling is made absolutely secure and the abutting ends of the rails prevented from lateral or other movement.

The invention is fully disclosed in the following specification, of which the accompanying drawings form a part, in which the separate parts of my improvement are designated by suitable reference characters in each of the views, and in which—

Figure 1 is a side view of a railway-rail joint or coupling made according to my invention; Fig. 2, a view similar to Fig. 1, but showing the oppostie side; Fig. 3, a section on the line 3 3 of Fig. 1; Fig. 4, a view similar to Fig. 3, but showing a slight modification; Fig. 5, a section on the line 5 5 of Fig. 1; Fig. 6, a view similar to Fig. 5, but showing the modified form of fish plates or bars; and Fig. 7, a plan view of the construction shown in Fig. 6 and partially in section.

In the drawings forming part of this specification, reference being made to Figs. 1, 2, and 7, I have shown at $a$ the abutting ends of two railway-rails, the said rails consisting of the usual base formed by the flanges $a^2$, the central web portion $a^3$, and the top body or bearing portion $a^4$, and in the practice of my invention I provide two fish plates or bars $b$, the body portions of which fit between the top body or bearing portion $a^4$ and the base or base-flanges $a^2$, and said fish plates or bars $b$ in the form of construction shown in Figs. 1, 4, and 5 are provided with outwardly-directed bottom flanges $b^2$, which overlap the base-flanges $a^2$ of the rails and which are provided with horizontal bottom plates $b^3$, on which the base-flanges of the rails rest, and the outwardly-directed bottom flanges $b^2$ of the fish plates or bars $b$ and the horizontal bottom members $b^3$ of said fish plates or bars form longitudinal grooves or recesses $b^4$, in which the base-flanges of the rails fit.

The fish plates or bars $b$ are connected by bolts $c$, which are passed through the web portions $a^3$ of the rails, as clearly shown in Figs. 3 to 6, inclusive, and said bolts are provided with the usual head at one end and in the form of construction shown in Figs. 3 and 4 are screw-threaded at the opposite end and provided with a nut $c^2$. The nuts $c^2$ are provided with laterally-directed lugs or projections $c^3$, and in the form of construction shown in Fig. 3 these lugs or projections consist of the ends of a pin $c^4$, passed through the nuts $c^2$ and the screw-threaded ends of the bolts $c$, and in connection with the lugs or projections $c^3$ I employ cam-dogs $d$, comprising a head portion $d^2$, having side jaws $d^3$, provided with downwardly and backwardly directed recesses $d^4$, adapted to receive the lugs or projections $c^3$, and the said jaws $d^3$ are provided with cam-surfaces $d^5$, adapted to bear on the side of the adjacent fish plate or bar $b$, and said cam-dogs are also provided with projectiong members $d^6$, which form handles by which they may be operated. When the cam-dogs $d$ are swung downwardly into the position shown in Fig. 3, the fish plates or bars $b$ will be securely locked together and to the rails $a$, and between the fish plates or bars $b$ and web portions $a^3$ of the rails $a$ are spaces $e$, which enable said fish plates or bars to be securely clamped to the rails, the form of said fish plates or bars being such as to give the same a slight spring movement when the cam-dogs $d$ are forced downwardly into the position shown in Fig. 3. The ends of the projecting handle portions $d^6$ of the cam-dogs $d$ are also provided with a notch or recess $d^7$, and said cam-dogs when in the position shown in Fig. 3 may be raised into the position shown in Fig. 4 by inserting a bar or other tool into said recesses $d^7$, which operation is performed when it is desired to unlock the dogs $d$, as shown in said figure.

In the construction shown in Fig. 4 the fish plate or bar $b$, in connection with which the cam-dogs $d$ operate, is provided with recesses $f$, adapted to receive the bearing-surfaces of the jaws $d^3$ of the cam-dogs $d$, and with this exception and another hereinafter described the construction shown in Figs. 3 and 4 is the same.

The bottom plates $b^3$ of the fish plates or bars $b$ are provided with transverse tubular bearings $f^2$, and passed therethrough are bolts $f^3$, provided at one end with a head $f^4$ and at the opposite end with a transverse hole $f^5$, as shown in Fig. 5, and adapted to receive a lock-pin $f^6$, as shown in Figs. 3 and 4. Mounted on the end of the bolts $f^3$ opposite the heads $f^4$ is a collar $g$, which is held in position by the corresponding pin $f^6$, and between the collar $g$ and the end of the adjacent tubular bearing $f$ is a cam-block $g^2$, adapted to turn on the bolt $f^3$, and in the form of construction shown in Figs. 3 and 5 the cam-block $g^2$ is provided on its opposite sides with cam-teeth $g^3$, and the collar $g$ and the end of the adjacent tubular bearing $f^2$ are provided with corresponding cam-teeth $g^4$, which extend in a direction opposite to that of the cam-teeth $g^3$, and by turning the cam-block $g^2$ in one direction the bases or bottom portions of the fish plates or bars $b$ will be securely clamped together, and by turning said cam-block in the opposite direction the said bases or bottom portions will be released.

In the construction shown in Fig. 4 the cam-block $g^2$ is provided with cam-teeth only on the side thereof adjacent to the corresponding tubular bearing $f^2$, and said tubular bearing is also provided with cam-teeth which correspond with those on the cam-block $g^2$, and it will therefore be seen that in Figs. 3 and 5 the cam-block $g^2$ is a double cam block or lock, while in Fig. 4 it is a single cam block or lock.

It will be understood, of course, that the bolts $f^3$ operate in connection with the bolts $c$ in binding the ends of the rails $a$ together, and both sets of said bolts are, as will be seen, provided with cam-locks, the cam-blocks $g^2$ being in the form of nuts which may be turned by a wrench or spanner in the usual manner, while the cam-dogs $d$ are adapted to swing in a vertical plane.

In Figs. 3 and 4 the parts $c^2$ consist of nuts screwed onto the ends of the bolts $c$; but in Figs. 4 and 5 these parts consist of tubular sleeves or collars $h$, through which are passed pins $h^2$, which are also passed through the ends of the bolts $c$ and which project to form bearings or journals for the jaws $d^3$ of the dogs $d$, and in this form of construction the adjacent fish plate or bar $b$ is provided with vertically-arranged flanges $i$, between which the jaws $d^3$ of the dogs $d$ operate.

In the construction shown in Fig. 6 the tubular bearings $f^2$, with which the bottom portions $b^3$ of the fish plates or bars $b$ are provided, are omitted, and the bottom portions or base member $b^3$ of said fish plates or bars are integrally connected, so that the said fish plates or bars form an integral coupling or joint into which the ends of the rails are passed, the top portions of said fish plates or bars being connected by the bolts $e$ in the same manner as in the construction shown in Figs. 3, 4, and 5.

By means of my improvement I provide a railway-rail joint or coupling in which the ordinary bolts and nuts are dispensed with and the fish plates or bars are locked together by means of bolts provided with cam-dogs which operate as positive locks and which securely bind the fish plates or bars to the rails, this operation being similar to that of a wedge, and the ends of the rails when connected in this manner will not vibrate or be capable of any lateral or other movement, but may be quickly separated whenever desired by releasing the cam locks or dogs, as herein described, the operation of the cam locks or dogs being facilitated by the spring character of the metal of which the fish plates or bars are composed.

Having fully described my invention, what I claim as new, and desire to secure by Letters Patent, is—

1. A railway-rail coupling, comprising fish plates or bars connected by bolts which are passed therethrough and through the webs of the rails, said bolts being provided at one end with cam-locks which operate in connection therewith and in connection with the adjacent fish plate or bar, said fish plates or bars being also provided with bottom members which inclose the base-flanges of the rail and which are also connected by bolts provided with cam-locks, substantially as shown and described.

2. A railway-rail joint or coupling, comprising fish plates or bars which are secured thereto by means of bolts passed therethrough and through the webs of the rails, said bolts being provided at one end with cam-dogs adapted to swing in a vertical plane and which operate in connection with said bolts and the adjacent fish plate or bar, substantially as shown and described.

3. A railway-rail joint or coupling, comprising fish plates or bars which are secured thereto by means of bolts passed therethrough and through the webs of the rails, said bolts being provided at one end with cam-dogs adapted to swing in a vertical plane and which operate in connection with said bolts and the adjacent fish plate or bar, said fish plates or bars being also provided with bottom members which inclose the base-flanges of the rails and which are connected by bolts provided at one end with rotatable cam-locks, substantially as shown and described.

4. A railway-rail coupling, comprising fish plates or bars connected by bolts which are passed therethrough and through the webs of the rail, said bolts being provided at one end with cam-locks and the interior surfaces of said plates or bars being hollowed out, substantially as shown and described.

In testimony that I claim the foregoing as my invention I have signed my name, in presence of the subscribing witnesses, this 20th day of October, 1904.

WALTER BARNETT.

Witnesses:
   CHAS. P. MACFALL,
   PHILIP H. BURRELL.